United States Patent
Reial et al.

(10) Patent No.: US 11,611,420 B2
(45) Date of Patent: Mar. 21, 2023

(54) CSI-RS FOR AMM MEASUREMENTS

(71) Applicant: Telefonaktiebolaget LM Ericsson (publ), Stockholm (SE)

(72) Inventors: Andres Reial, Malmö (SE); Icaro L. J. Da Silva, Solna (SE); Rui Fan, Beijing (CN); Claes Tidestav, Bålsta (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 65 days.

(21) Appl. No.: 16/493,206

(22) PCT Filed: Mar. 26, 2018

(86) PCT No.: PCT/SE2018/050319
§ 371 (c)(1),
(2) Date: Sep. 11, 2019

(87) PCT Pub. No.: WO2018/174811
PCT Pub. Date: Sep. 27, 2018

(65) Prior Publication Data
US 2020/0136787 A1    Apr. 30, 2020

(30) Foreign Application Priority Data

Mar. 24, 2017   (WO) ................ PCT/CN2017/078191

(51) Int. Cl.
*H04L 5/00*     (2006.01)
*H04W 24/08*    (2009.01)

(52) U.S. Cl.
CPC .......... *H04L 5/0057* (2013.01); *H04W 24/08* (2013.01)

(58) Field of Classification Search
CPC ....... H04L 5/0057; H04L 1/20; H04L 5/0007; H04L 5/0023; H04L 5/005; H04B 7/0695; H04W 24/08; H04W 36/0085; H04W 36/08; H04W 36/30
See application file for complete search history.

(56) References Cited

U.S. PATENT DOCUMENTS

2013/0044707 A1   2/2013   Chen
2013/0258886 A1   10/2013  Chen et al.
(Continued)

FOREIGN PATENT DOCUMENTS

CN   103339982 A   10/2013
CN   103380638 A   10/2013
(Continued)

OTHER PUBLICATIONS

3GPP TSG-RAN WG1 Meeting #88-bis; Spokane, US; Source: Ericsson; Title: CSI-RS for active mode mobility measurements (R1-1706017)—Apr. 3-7, 2017.
(Continued)

*Primary Examiner* — Derrick V Rose
(74) *Attorney, Agent, or Firm* — Christopher & Weisberg, P.A.

(57) ABSTRACT

According to some embodiments, a method for use in a network node of transmitting a measurement signal for evaluating a quality of a link from a cell comprises: determining (412) a first virtual identifier for a first link; determining (414) a group of one or more channel state information reference signal (CSI-RS) sequences that are available to be transmitted from the cell; associating (420) one or more of a frequency resource allocation, a time resource allocation, a CSI-RS sequence from the group of one or more CSI-RS sequences, and a layer allocation with the first virtual identifier; and transmitting (422) a first CSI-RS for measurement using one or more of the frequency resource allocation, time resource allocation, CSI-RS sequence, and layer allocation associated with the first virtual identifier.

14 Claims, 8 Drawing Sheets

(56) References Cited

U.S. PATENT DOCUMENTS

| | | | |
|---|---|---|---|
| 2015/0092768 A1 | 4/2015 | Ng et al. | |
| 2016/0150431 A1* | 5/2016 | Zhang | H04W 56/0015 |
| | | | 370/252 |
| 2016/0352487 A1* | 12/2016 | Chen | H04L 5/0048 |
| 2017/0026938 A1* | 1/2017 | Onggosanusi | H04B 7/0626 |
| 2017/0078953 A1 | 3/2017 | You et al. | |
| 2018/0241602 A1* | 8/2018 | Bhorkar | H04L 5/001 |
| 2019/0199412 A1* | 6/2019 | Koskela | H04W 72/0446 |
| 2019/0387423 A1* | 12/2019 | Takahashi | H04B 17/318 |
| 2020/0287677 A1* | 9/2020 | Kakishima | H04B 7/0695 |

FOREIGN PATENT DOCUMENTS

| | | |
|---|---|---|
| EP | 2 665 201 A2 | 11/2013 |
| WO | 2014 165699 A2 | 10/2014 |

OTHER PUBLICATIONS

PCT International Search Report for International application No. PCT/SE2018/050319—dated Jul. 13, 2018.

PCT Written Opinion of the International Searching Authority for International application No. PCT/SE2018/050319—dated Jul. 13, 2018.

Extended European Search Report issued for Application No./Patent No. 18772028.9-1220/3603164 PCT/SE2018050319—dated Oct. 15, 2020.

Coordinated Multipoint Transmission and Reception in LTE-Advanced Systems by Juho Lee et al.; Technology Updates on LTE Advanced—Nov. 2012.

3GPP TSG-RAN WG1 #72bis; Chicago, USA; Source: MediaTek Inc.; Title: Performance evaluation for small cell discovery using legacy reference signals (R1-131684)—Apr. 15-19, 2013.

EPO Communication dated Jun. 2, 2021 for Patent Application No. 18772028.9, consisting of 9-pages.

3GPP TSG RAN WG1 NR Ad-Hoc Meeting R1-1700134; Title: On CSI-RS for beam management; Agenda Item: 5.1.2.3.1; Source: ZTE, ZTE Microelectronics; Document for: Discussion and Decision; Date and Location: Jan. 16-20, 2017, Spokane, USA, consisting of 7-pages.

Chinese Office Action with English Machine Translation dated Aug. 30, 2022 for Patent Application No. 201880018516.5, consisting of 16-pages.

Juho Lee et al.; Coordinated Multipoint Transmission and Reception in LTE-Advanced Systems; IEEE Communications Magazine, vol. 50, Issue 11; Nov. 2012, consisting of 7-pages.

* cited by examiner

CSI-RS FOR AMM MEASUREMENTS

PRIORITY

This nonprovisional application is a U.S. National Stage Filing under 35 U.S.C. § 371 of International Patent Application Ser. No. PCT/SE2018/050319 filed Mar. 26, 2018 and entitled "CSI-RS FOR AMM MEASUREMENTS" which claims priority to International Patent Application Ser. No. PCT/CN2017/078191 both of which are hereby incorporated by reference in their entirety.

TECHNICAL FIELD

Particular embodiments are directed to wireless communications and, more particularly, to using a channel state information reference signal (CSI-RS) for active mode mobility (AMM) measurements.

BACKGROUND

Third Generation Partnership Project (3GPP) long term evolution (LTE) uses a channel state information reference signal (CSI-RS) primarily for evaluating the quality of different beamforming and multi-layer transmission scheme options towards a user equipment (UE). A CSI-RS resource is specifically configured for a UE and can have 1, 2, 4, 8, 12, 16, 20, 24, 28, or 32 ports or antenna ports. Its periodicity is 5, 10, 20, 40, or 80 milliseconds (ms). CSI-RS spans full system bandwidth.

For 1 and 2 ports measurements, 2 resource elements in 2 adjacent orthogonal frequency division multiplexed (OFDM) symbols and Code Division Multiplexing-Time (CDM-T) are used, where two ports are separated using an orthogonal cover code (OCC). Arbitrary CSI-RS subframe grid offset is supported. CSI-RS is configured by the serving cell to a UE, providing a time and frequency (T/F) reference. A CSI-RS symbol sequence depends on slot index (0-19) and symbol index in the slot. A sequence generator is initialized with cell identifier (default) or a virtual cell identifier (RRC), which makes the generated sequence for the CSI-RS distinguishable from other cells' or users' CSI-RS. An example is illustrated in FIG. 1.

FIG. 1 illustrates an example resource element grid showing the location of CSI-RS. The horizontal axis represents the time domain and the vertical axis represents the frequency domain. Each column represents an OFDM symbol. The CSI-RS resource elements are illustrated as shown in the legend.

3GPP New Radio (NR) also uses CSI-RS with an LTE-like design. CSI-RS in NR includes flexible bandwidth; 1, 2 or 4 symbol-transmission; up to 16 CSI-RS may be transmitted per slot (12 during same symbol time); CSI-RS symbols contain only CSI-RS; and CSI-RS may be configured aperiodic, semi-persistent, and periodic. The CSI-RS sequence is generated using a physical cell identifier (PCI)-based seed, as in LTE. Some additional uses compared to LTE may include support of analog beam sweep, support for fine T/F tracking, and for radio link monitoring (RLM).

Modern cellular systems, such as 5G NR systems, may use advanced antenna systems containing large antenna arrays for data transmission. With such antenna arrays, data signals are transmitted in narrow beams to increase signal strength in some directions, and/or to reduce interference in other directions. One advantage is to obtain improved link quality and to enable spatial separation to reduce interference between users. Another advantage of using arrays is to ensure sufficient link quality in high-frequency deployments where the individual antenna element apertures are small and do not capture sufficient signal energy individually. Coherently aligning the elements gives rise to effective beam gain, but also beam directivity in a certain direction.

In active mode, the connection of a moving UE must be seamlessly handed over as the UE moves across the different cell coverage areas in the network. Handover is the process of transferring an ongoing connection of a UE from one node (the serving node) to another node (the target node), or from one cell to another within the same node. This provides a transparent service or service continuity over a larger area. The handover should happen without any loss of data and preferably with no interruption.

In legacy cell-based systems like LTE, the cell-specific reference signals (CRSs) are used for mobility measurements. These are broadcasted in all neighbor cells in an always-on manner over the entire bandwidth, regardless of the presence or position of UEs in the system. The CRS are easy to measure and yield consistent results, but static CRS signaling leads to high resource usage, high power consumption, and constant inter-cell interference generation in the downlink.

Some base stations continuously transmit pilot signals that UEs in their own and neighbor cells use to estimate the target cell quality. This is true at least for GSM (BCCH), WCDMA (CPICH) and in WiFi (beacon). Each UE performs periodic measurements and reports the measurement results to the network when certain reporting conditions are met (periodic or event based). If it is detected that the serving cell quality is getting close to another candidate cell power, a more detailed measurement process or a handover procedure may be initiated.

In some configurations, initial access signals (system synchronization (SS) and other associated signals like primary synchronization signal (PSS) and secondary synchronization signal (SSS)), if transmitted at a sufficient rate, may also be used for active mode mobility (AMM) measurements. The signals facilitate estimating the link qualities with respect to the candidate cells for measurement reporting back to the network.

In modern beam-based systems, serving and target node identities are often no longer sufficient for maintaining seamless connections during inter-node handover. Handover management between narrow beams in neighboring base stations becomes a necessity. The serving base station also needs to determine if a beam switch or beam update is necessary within its own cell. The serving link may thus effectively be the beam through which the base station is currently communicating with the UE, and the beam it will hand over or switch to becomes the target link.

In a beam-based system like NR, it is desirable to avoid excessive static downlink reference signal signaling. Instead, the network may turn on special mobility reference signals (MRS) only when needed, such as when there are UEs found in a given network region, or in a UE-specific manner only in relevant candidate beams. It may be done periodically or when the network determines that a beam update for the UE may be needed (e.g., when decreasing serving beam quality is detected). Each activated beam transmits an MRS that carries the beam identity.

In such a system, various MRS measurement and reporting strategies may be employed. In an LTE-like setup, the UE may continuously monitor the received sample stream for the presence of MRS. When some event criterion is fulfilled (e.g., any MRS is detected with signal quality exceeding a threshold), the UE may report the received beam identifier and signal quality to the network. The reports may be used for mobility decisions and for building an automatic neighbor relation (ANR) database at automatic neighbor (AN) or beam resolution level.

In an alternative 5G-style design, the network triggers MRS measurements by transmitting a measurement command via control signaling (e.g., when degrading serving link quality or another reason for initiating mobility measurements is identified). The measurement command may contain reporting instructions and/or an explicit list of MRS to measure. The serving and/or other candidate ANs reserve uplink resources for receiving measurement reports in the uplink.

3GPP specifications for 5G may include CSI-RS-like signal structures used as an MRS for AMM measurements, in addition to the PSS/SSS signals. A motivation for using CSI-RS for AMM may include, for example, any of the following: (a) inter-transmission reception point (TRP) mobility in multi-TRP cells where PSS/SSS is transmitted as single frequency network (SFN); (b) desired beam mobility resolution is higher than PSS/SSS beam sweep resolution; and (c) wide-band measurements desired for improved fading robustness in moderately dispersive environments or to improve measurement accuracy. In contrast to PSS/SSS, CSI-RS can be dynamically turned on and off and configured according to suitable parameters (period, bandwidth, number of unique links supported, etc.) by the network based on the presence of UEs and their mobility needs.

At least one problem with using LTE-like CSI-RS design is that the CSI-RS sequence (i.e., the generator seed) depends on the cell identifier, and a single CSI-RS transmission is performed during a slot. The 16 possible CSI-RS port positions in a slot facilitate identifying up to 16 unique beams per cell that can be measured per slot. This may not be sufficient to support AMM for multi-TRP cells even with few beams per cell, or single-TRP cells with many beams.

Furthermore, in default CSI-RS design, CSI-RS is spread over the entire bandwidth of a carrier. However, CSI-RS may occupy a partial bandwidth of a carrier, and the SS may not be located in the center of the carrier. If not configured properly, the UE may not know where to find CSI-RS. Additional beams may be supported by extending the sweep duration to multiple CSI-RS slots, but the increased measurement latency may be prohibitive (e.g., in deployments with sudden shadowing or at high speeds).

The alternatives described in the Background section are not necessarily alternatives that have been previously conceived or pursued. Therefore, unless otherwise indicated herein, the alternatives described in the Introduction section are not prior art and are not admitted to be prior art by inclusion in the Introduction section.

SUMMARY

The embodiments described herein provide for an improved channel state information reference signal (CSI-RS) allocation and configuration that facilitates more efficient active mode mobility (AMM) measurements. Particular embodiments include a CSI-RS design to support AMM measurements in deployments with a large number of required unique beam identifiers per cell and the time/frequency location of CSI-RS is flexible.

The beam identifier is embedded in (e.g., formed as an aggregate of) one or more of (1) frequency resource allocation, (2) the choice of the specific transmitted sequence within a CSI-RS sequence group, (3) time resource allocation of the CSI-RS symbol resource during the measurement slots, and (4) layer in the orthogonal cover code (OCC)-coded symbol cluster. In particular embodiments, the specific transmitted sequence (e.g., the CSI-RS sequence) may be defined via a virtual identifier that may be used as a seed for CSI-RS sequence generation. The CSI-RS sequence group may be based on the cell identifier or may constitute all or a part of the full virtual identifier space. This is in contrast to LTE where a single CSI-RS sequence may be transmitted for a given cell identifier (CID), the beam identifier (BID) is embedded in the frequency resource allocation, and a single CSI-RS symbol cluster may be transmitted during a slot.

In particular embodiments, the user equipment (UE) procedure for AMM measurements includes detecting the candidate cell's system synchronization (SS) and optionally obtaining the cell identifier, then performing measurements using CSI-RS sequences corresponding to a CSI-RS sequence group that optionally depend on the obtained cell identifier and multiple possible frequency and time allocations. Particular embodiments may configure the UE with the CSI-RS time and frequency (T/F) location in relation to the detected SS location to handle the fact that the SS may not be located in the center of the band, and/or the CSI-RS in not transmitted over the full bandwidth.

According to some embodiments, a method for use in a network node of transmitting a measurement signal for evaluating a quality of a link from a cell comprises: determining a first virtual identifier for a first link; determining a group of one or more CSI-RS sequences that are available to be transmitted from the cell; associating one or more of a frequency resource allocation, a time resource allocation, a CSI-RS sequence from the group of one or more CSI-RS sequences, and a layer allocation with the first virtual identifier; and transmitting a first CSI-RS for measurement using one or more of the frequency resource allocation, time resource allocation, CSI-RS sequence, and layer allocation associated with the first virtual identifier.

In particular embodiments, determining the virtual identifier is based on a cell identifier of the cell. Determining the virtual identifier may be based on at least one of a beam identifier in a multi-beam cell, a transmission reception point (TRP) in a multi-TRP cell, or a sector in a multi-sector cell. A portion of the virtual identifier may be encoded in the transmitted CSI-RS sequence.

In particular embodiments, the method further comprises transmitting CSI-RS configuration information to a wireless device. The CSI-RS configuration information comprises, for each CSI-RS of a plurality of CSI-RS, one or more of a frequency resource allocation, a time resource allocation, a CSI-RS sequence, and a layer allocation. At least part of the CSI-RS configuration information may be specified relative to a center frequency of the cell.

In particular embodiments, the method further comprises transmitting a SS signal to the wireless device. At least part of the CSI-RS configuration information may be specified relative to a time and frequency position of the transmitted SS signal.

In particular embodiments, the method further comprises: determining a second virtual identifier for a second link; associating one or more of a frequency resource allocation, a time resource allocation, a CSI-RS sequence from the group of one or more CSI-RS sequences, and a layer allocation with the second virtual identifier; transmitting a second CSI-RS for measurement using one or more of the frequency resource allocation, time resource allocation, CSI-RS sequence, and layer allocation associated with the second virtual identifier; and receiving a measurement report. The measurement report includes a virtual identifier. The method further comprises determining whether the measurement report is associated with the first link or the second link based on the virtual identifier in the measurement report.

According to some embodiments, a network node is operable to transmit a measurement signal for evaluating a quality of a link from a cell. The network node comprises processing circuitry operable to: determine a first virtual identifier for a first link; determine a group of one or more CSI-RS sequences that are available to be transmitted from the cell; associate one or more of a frequency resource allocation, a time resource allocation, a CSI-RS sequence from the group of one or more CSI-RS sequences, and a layer allocation with the first virtual identifier; and transmit a first CSI-RS for measurement using one or more of the frequency resource allocation, time resource allocation, CSI-RS sequence, and layer allocation associated with the first virtual identifier.

In particular embodiments, the processing circuitry is operable to determine the virtual identifier based on a cell identifier of the cell. The processing circuitry may be operable to determine the virtual identifier based on at least one of a beam identifier in a multi-beam cell, a TRP in a multi-TRP cell, or a sector in a multi-sector cell. A portion of the virtual identifier may be encoded in the transmitted CSI-RS sequence.

In particular embodiments, the processing circuitry is further operable to transmit CSI-RS configuration information to a wireless device. The CSI-RS configuration information comprises, for each CSI-RS of a plurality of CSI-RS, one or more of a frequency resource allocation, a time resource allocation, a CSI-RS sequence, and a layer allocation. At least part of the CSI-RS configuration information may be specified relative to a center frequency of the cell.

In particular embodiments, the processing circuitry is further operable to transmit a SS signal to the wireless device. At least part of the CSI-RS configuration information may be specified relative to a time and frequency position of the transmitted SS signal.

In particular embodiments, the processing circuitry further is operable to: determine a second virtual identifier for a second link; associate one or more of a frequency resource allocation, a time resource allocation, a CSI-RS sequence from the group of one or more CSI-RS sequences, and a layer allocation with the second virtual identifier; transmit a second CSI-RS for measurement using one or more of the frequency resource allocation, time resource allocation, CSI-RS sequence, and layer allocation associated with the second virtual identifier; receive a measurement report comprising a virtual identifier; and determine whether the measurement report is associated with the first link or the second link based on the virtual identifier in the measurement report.

According to some embodiments, a method for use in a wireless device of measurement of a link quality comprises obtaining CSI-RS configuration information. The CSI-RS configuration information comprises, for a plurality of CSI-RS, one or more of a frequency resource allocation, a time resource allocation, a CSI-RS sequence generator seed, a bandwidth allocation, and a layer allocation. The method further comprises measuring a CSI-RS associated with a link according to the obtained CSI-RS configuration information and reporting a quality of the measured CSI-RS to a network node.

In particular embodiments, at least one allocation of the CSI-RS configuration indicates two or more possible values for the respective parameters. Measuring the CSI-RS may comprise measuring according to a parameter combination in the allocations provided in the obtained CSI-RS configuration information.

In particular embodiments, measuring the CSI-RS associated with the link comprises blindly searching the allocations in the CSI-RS configuration for the CSI-RS.

In particular embodiments, the method further comprises determining a virtual identifier of the measured CSI-RS based on one or more of a frequency resource allocation, a time resource allocation, a CSI-RS sequence, a bandwidth allocation, and a layer allocation of the measured CSI-RS. Reporting the quality of the measured CSI-RS includes reporting the determined virtual identifier associated with the measured CSI-RS.

In particular embodiments, at least part of the CSI-RS configuration information is specified relative to a center frequency of a cell.

In particular embodiments, the method further comprises detecting a SS signal. At least part of the CSI-RS configuration information may be specified relative to a time and frequency position of the detected SS signal. The method may further comprise determining a cell identifier based on the detected SS signal. Determining the virtual identifier of the measured CSI-RS may be based on the determined cell identifier. Measuring the CSI-RS associated with the link may comprise searching a subset of the allocations in the CSI-RS configuration for the CSI-RS. The subset is based on the detected SS signal.

In particular embodiments, the virtual identifier is associated with at least one of a beam identifier in a multi-beam cell, a TRP in a multi-TRP cell, or a sector in a multi-sector cell. Obtaining the CSI-RS configuration information may comprise receiving the CSI-RS configuration information from the network node.

According to some embodiments, a wireless device is capable of measurement of a link quality. The wireless device comprises processing circuitry operable to obtain CSI-RS configuration information. The CSI-RS configuration information comprises, for a plurality of CSI-RS, one or more of a frequency resource allocation, a time resource allocation, a CSI-RS sequence generator seed, a bandwidth allocation, and a layer allocation. The processing circuitry is further operable to measure a CSI-RS associated with a link according to the obtained channel state information and report a quality of the measured CSI-RS to a network node.

In particular embodiments, at least one allocation of the CSI-RS configuration indicates two or more possible values for the respective parameters. Measuring the CSI-RS may comprise measuring according to a parameter combination in the allocations provided in the obtained CSI-RS configuration information.

In particular embodiments, the processing circuitry is operable to measure the CSI-RS associated with the link by blindly searching the allocations in the CSI-RS configuration for the CSI-RS.

In particular embodiments, the processing circuitry is further operable to determine a virtual identifier of the measured CSI-RS based on one or more of a frequency resource allocation, a time resource allocation, a CSI-RS sequence, a bandwidth allocation, and a layer allocation of the measured CSI-RS. The processing circuitry may be operable to report the quality of the measured CSI-RS by reporting the determined virtual identifier associated with the measured CSI-RS.

In particular embodiments, at least part of the CSI-RS configuration information is specified relative to a center frequency of a cell.

In particular embodiments, the processing circuitry is further operable to detect a SS signal. At least part of the CSI-RS configuration information may be specified relative to a time and frequency position of the detected SS signal. The processing circuitry may be further operable to determine a cell identifier based on the detected SS signal. The processing circuitry may be operable to determine the virtual identifier of the measured CSI-RS based on the determined cell identifier. The processing circuitry may be operable to measure the CSI-RS associated with the link by searching a subset of the allocations in the CSI-RS configuration for the CSI-RS. The subset is based on the detected SS signal.

In particular embodiments, the virtual identifier is associated with at least one of a beam identifier in a multi-beam cell, a TRP in a multi-TRP cell, or a sector in a multi-sector cell. The processing circuitry may be operable to obtain the CSI-RS configuration information by receiving the CSI-RS configuration information from the network node.

According to some embodiments, a network node comprises a determining module, an associating module, and a transmitting module. The determining module is operable to determine a first virtual identifier for a first link and determine a group of one or more CSI-RS sequences that are available to be transmitted from the cell. The associating module is operable to associate one or more of a frequency resource allocation, a time resource allocation, a CSI-RS sequence from the group of one or more CSI-RS sequences, and a layer allocation with the first virtual identifier. The transmitting module is operable to transmit a first CSI-RS for measurement using one or more of the frequency resource allocation, time resource allocation, CSI-RS sequence, and layer allocation associated with the first virtual identifier.

According to some embodiments, a wireless device comprises an obtaining module, a measuring module, and a reporting module. The obtaining module is operable to obtain CSI-RS configuration information. The CSI-RS configuration information comprises, for a plurality of CSI-RS, one or more of a frequency resource allocation, a time resource allocation, a CSI-RS sequence generator seed, a bandwidth allocation, and a layer allocation. The measuring module is operable to measure a CSI-RS associated with a link according to the obtained channel state information. The reporting module is operable to report a quality of the measured CSI-RS to a network node.

Also disclosed is a computer program product. The computer program product comprises instructions stored on non-transient computer-readable media which, when executed by a processor, perform the steps of: determining a first virtual identifier for a first link; determining a group of one or more CSI-RS sequences that are available to be transmitted from the cell; associating one or more of a frequency resource allocation, a time resource allocation, a CSI-RS sequence from the group of one or more CSI-RS sequences, and a layer allocation with the first virtual identifier; and transmitting a first CSI-RS for measurement using one or more of the frequency resource allocation, time resource allocation, CSI-RS sequence, and layer allocation associated with the first virtual identifier.

Another computer program product comprises instructions stored on non-transient computer-readable media which, when executed by a processor, perform the steps of: obtaining CSI-RS configuration information; measuring a CSI-RS associated with a link according to the obtained CSI-RS configuration information; and reporting a quality of the measured CSI-RS to a network node.

Particular embodiments may exhibit some of the following technical advantages. For example, particular embodiments may perform AMM link quality measurements in deployments with large numbers of beams per cell without incurring excessive sweep times or measurement latencies. The beam identifier encoding dimensions offer a configurable framework to suit a wide range of deployments and desired mobility performance/cost trade-offs. Other technical advantages will be readily apparent to one skilled in the art from the following figures, description, and example claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
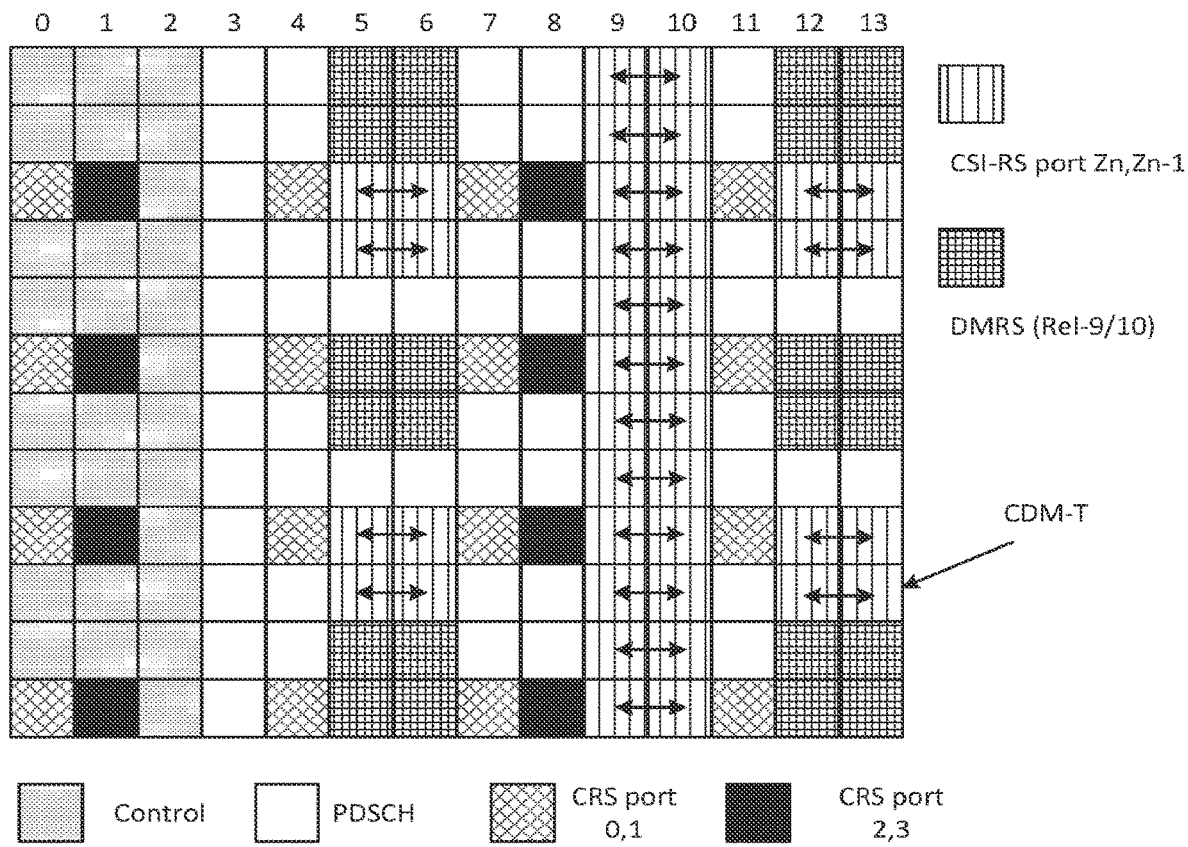
FIG. 1 illustrates an example resource element grid showing the location of CSI-RS.

Third Generation Partnership Project (3GPP) long term evolution (LTE) uses a channel state information reference signal (CSI-RS) primarily for evaluating the quality of different beamforming and multi-layer transmission scheme options towards a user equipment (UE). 3GPP New Radio (NR) also uses CSI-RS with an LTE-like design. Some additional uses compared to LTE may be support of analog beam sweep, support for fine time and frequency (T/F) tracking, and for radio link monitoring (RLM).

Modern cellular systems, such as 5G NR systems, may use advanced antenna systems containing large antenna arrays for data transmission. With such antenna arrays, data signals are transmitted in narrow beams to increase signal strength in some directions, and/or to reduce interference in other directions. In active mode, the connection of a moving UE must be seamlessly handed over as the UE moves across the different cell coverage areas in the network. In legacy cell-based systems like LTE, the cell-specific reference signals (CRSs) are used for mobility measurements. These are broadcasted in all neighbor cells in an always-on manner over the entire bandwidth, regardless of the presence or position of UEs in the system. The CRS are easy to measure and yield consistent results, but static CRS signaling leads to high resource usage, high power consumption, and constant inter-cell interference generation in the downlink.

In some configurations, initial access signals (system synchronization (SS) and other associated signals like primary synchronization signal (PSS) and secondary synchronization signal (SSS)), if transmitted at a sufficient rate, may also be used for active mode mobility (AMM) measurements. The signals facilitate estimating the link qualities with respect to the candidate cells for measurement reporting back to the network.

In modern beam-based systems, serving and target node identities are often no longer sufficient for maintaining seamless connections during inter-node handover. Handover management between narrow beams in neighboring base stations becomes a necessity. The serving base station also needs to decide if a beam switch or beam update is necessary within its own cell.

In a beam-based system like NR, it is desirable to avoid excessive static downlink reference signal signaling, so instead the network may turn on special mobility reference signals (MRS) only when needed, such as when there are UEs found in a given network region, or in a UE-specific manner only in relevant candidate beams. It may be done periodically or when the network determines that a beam update for the UE may be needed (e.g., when decreasing serving beam quality is detected). Each activated beam transmits an MRS that carries the beam identity.

At least one problem with using LTE-like CSI-RS design is that the CSI-RS sequence (i.e., the generator seed) depends on the cell identifier, and a single CSI-RS transmission is performed during a slot. The 16 possible CSI-RS port positions in a slot facilitate identifying up to 16 unique beams per cell that can be measured per slot. This may not be sufficient to support AMM for multi-transmission reception point (TRP) cells even with few beams per cell, or single-TRP cells with many beams.

Furthermore, in a default CSI-RS design, CSI-RS is spread over the entire bandwidth of a carrier. However, CSI-RS may occupy a partial bandwidth of a carrier and the SS may not be located in the center of the carrier. If not configured properly, the UE may not know where to find CSI-RS. Additional beams may be supported by extending the sweep duration to multiple CSI-RS slots, but the increased measurement latency may be prohibitive (e.g., in deployments with sudden shadowing or at high speeds).

Particular embodiments obviate the problems described above and include a CSI-RS design to support AMM measurements in deployments with a large number of required unique beam identifiers per cell and the time/frequency location of CSI-RS is flexible. In particular embodiments, the beam identifier is embedded in (i.e., formed as an aggregate of) one or more of (1) frequency resource allocation, (2) the choice of the specific transmitted sequence within a CSI-RS sequence group, (3) time resource allocation of the CSI-RS symbol resource during the measurement slots, and (4) layer in the orthogonal cover code (OCC)-coded symbol cluster. In particular embodiments, the specific transmitted sequence may be defined via a virtual identifier that may be used as a seed for CSI-RS sequence generation. The CSI-RS sequence group may be based on the cell identifier or may constitute all or a part of the full virtual identifier space.

In particular embodiments, the UE procedure for AMM measurements includes detecting the candidate cell's SS and optionally obtaining the cell identifier, then performing measurements using CSI-RS sequences corresponding to a CSI-RS sequence group that optionally depend on the obtained cell identifier and multiple possible frequency and time allocations. Particular embodiments may configure the UE with the CSI-RS time and frequency (T/F) location in relation to the detected SS location to handle the fact that the SS may not be located in the center of the band, and/or the CSI-RS in not transmitted over the full bandwidth.

Particular embodiments may perform AMM link quality measurements in deployments with large numbers of beams per cell without incurring excessive sweep times or measurement latencies. The beam identifier encoding dimensions offer a configurable framework to suit a wide range of deployments and desired mobility performance/cost tradeoffs.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

The separate terms T/F location and T/F allocation are used herein. T/F location refers to the frequency range of the AMM CSI-RS allocation and time offset from a cell time reference (e.g., SS reception instance) to the start of the AMM CSI-RS measurement slot. T/F allocation refers to which of the symbol clusters within the AMM slot and which resource elements within the CSI-RS symbols are allocated to a given beam.

CSI-RS sequence group refers to a set of one or multiple sequences (e.g., generator seeds) that are mapped to a given cell identifier (CID). CSI-RS symbol cluster refers to the 1, 2 or 4 symbols making up a CSI-RS transmission for different numbers of ports. Particular embodiments may transmit multiple symbol clusters during a special measurement slot, referred to as AMM slot.

A CSI-RS resource is formed by aggregating one or more CSI-RS units in one or more OFDM symbols within a slot. A CSI-RS unit consists of a pair of adjacent resource elements (or adjacent subsampled resource elements) within the same orthogonal frequency division multiplexing (OFDM) symbol.

Link is used as a common term for different sub-divisions of a cell beam, sector (in case of "sector beams"), TRP (in case of multiple single-beam TRPs per cell), etc. The term beam identifier refers to a link.

Particular embodiments are described with reference to FIGS. 2-7B of the drawings, like numerals being used for like and corresponding parts of the various drawings. LTE and NR are used throughout this disclosure as an example cellular system, but the ideas presented herein may apply to other wireless communication systems as well.

Figure 2:
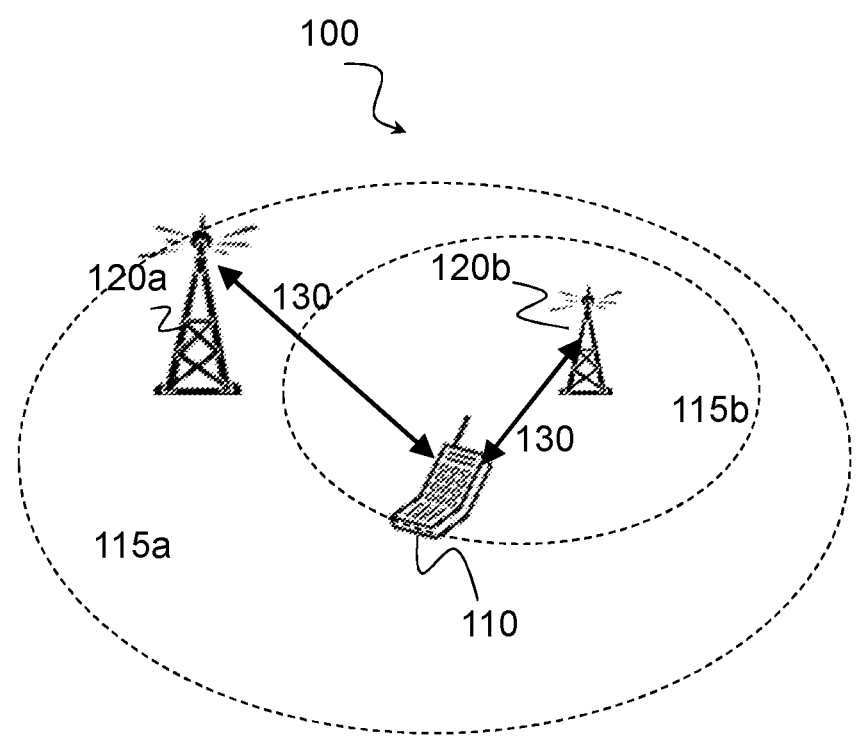
FIG. 2 is a block diagram illustrating an example wireless network, according to some embodiments.

FIG. 2 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120). Wireless signals 130 may include reference signals, such as CSI-RS reference signals, and synchronization signals, such as SS signals.

Each network node 120 may have a single transmitter 140 or multiple transmitters 140 for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless device 110 may move between cell 115a and cell 115b. Network node 120a may handover wireless device 110 to network node 120b. Network node 120a may determine a virtual identifier for the candidate link based at least on one of a beam identifier in a multi-beam cell, a TRP in a multi-TRP cell, or a sector in a multi-sector cell. Network node 120a may determine a group of one or more CSI-RS sequences that are available to be transmitted from cell 115, and select, based on the determined virtual identifier, one or more of (1) a frequency resource allocation, (2) a CSI-RS sequence from the group of one or more CSI-RS sequences, (3) a time resource allocation, and (4) a layer allocation. Network node 120a may transmit a CSI-RS for mobility measurement using one or more of the selected frequency resource allocation, the selected time resource allocation, the selected CSI-RS sequence, and the layer allocation.

Wireless device 110 may detect a synchronization signal; measure a CSI-RS according to a predetermined set of time resource allocations, frequency resource allocations, layer allocations, bandwidth and CSI-RS sequences; and report one or more CSI-RS measurements to network node 120a. Particular algorithms for wireless device mobility are described in more detail with respect to FIGS. 3-5.

In wireless network 100, each network node 120 may use any suitable radio access technology, such as long term evolution (LTE), LTE-Advanced, NR, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 6A below. Similarly, a network node may include any suitable combination of hardware and/or software. For example, in particular embodiments, a network node, such as network node 120, may include the components described with respect to FIG. 7A below.

For transmitting CSI-RS, particular embodiments may include an expanded beam address space. For example, to facilitate measuring a larger number of beams without unduly stretching out the measurement interval, particular embodiments may define AMM measurement slots where more than a single CSI-RS symbol cluster is transmitted. As a particular example, assuming single-symbol clusters and 14 symbols per slot, 12*14=168 beams per cell may be swept during one slot. To further increase the number of beams via expanded time allocation, multiple adjacent slots may be allocated to AMM CSI-RS transmission, or multiple subsequent slots within the periodic AMM slot pattern may be allocated to a given beam sweep instance.

In another aspect of particular embodiments, the CSI-RS sequence may be used to partially or fully encode the beam identifier. In the default CSI-RS design, the sequence only depends on the cell identifier, and all CSI-RSs from a certain cell use the same sequence. To increase the beam index space that can be supported during one CSI-RS transmission, particular embodiments use multiple sequences per cell identifier. The UE performs measurements with respect to multiple such reference sequences and the detected sequence conveys a part of the beam identifier, while the rest of the beam identifier is provided, for example, by the time/frequency resource location.

In some embodiments, a beam identifier may identify a beam within a cell (e.g., equivalent to a beam counter). The beam identifier may represent the frequency allocation, time allocation, and some aspects of sequence allocation within the cell. Thus, multiple neighbor cells may have beams with similar identifiers. To uniquely identify a beam in a wider measurement region, particular embodiments may report a combination of the beam identifier and a cell identifier.

A virtual identifier is an efficient unique description of a beam in the measurement region including multiple cells. The virtual identifier typically can be shorter in terms of bits than the aggregated beam identifier and cell identifier. In some embodiments, the beam identifier as maintained by the network may be equivalent to the virtual identifier if it provides unique identification of beams transmitted in the relevant set of neighbor cells. An advantage of particular embodiments is that the number of supported beams per cell per sweep can be increased. Up to 12 beams out of a larger total set of beams may then be presented for measurement per CSI-RS symbol cluster transmission. This is usually sufficient because not all available beams in each cell may need to be activated at each beam sweep.

The described relationship constitutes a one-to-many mapping where the CID maps to multiple virtual identifiers, where each virtual identifier corresponds to a beam transmitted from that cell. The UE can determine the cell identifier based on the received virtual identifier and, for example, perform required beam grouping operations prior to reporting.

In an extension of the above configuration, all of the virtual identifiers (associated with the CSI-RS sequence seed) may encode part of the beam identifier. This is appropriate in situations where the CSI-RS transmitted in a beam to be measured does not need to be associated with a particular cell, but only identified uniquely among all received beams from multiple cells.

As an alternative to using multiple single-symbol clusters, a multiple-symbol cluster and OCC over multiple-RE groups across the cluster may be used to accommodate multiple beams.

The available beam address space as the number of links that can be covered during a single AMM sweep from a cell may thus be summarized as the product of: (a) number of AMM CSI-RS symbol clusters per slot (e.g., 7 in FIG. 1); (b) number of layers per cluster (2); (c) number of slots per AMM transmission (2); (d) number of AMM transmissions per sweep (2); (e) number of frequency allocations per slot (12); and (f) number of sequences per cell identifier specific sequence group.

If the system design is not concerned with identifying beams per cell, the entire sequence space (virtual identifier space) may be made available to a group of cells without cell-specific virtual identifier allocations.

Figure 3A:
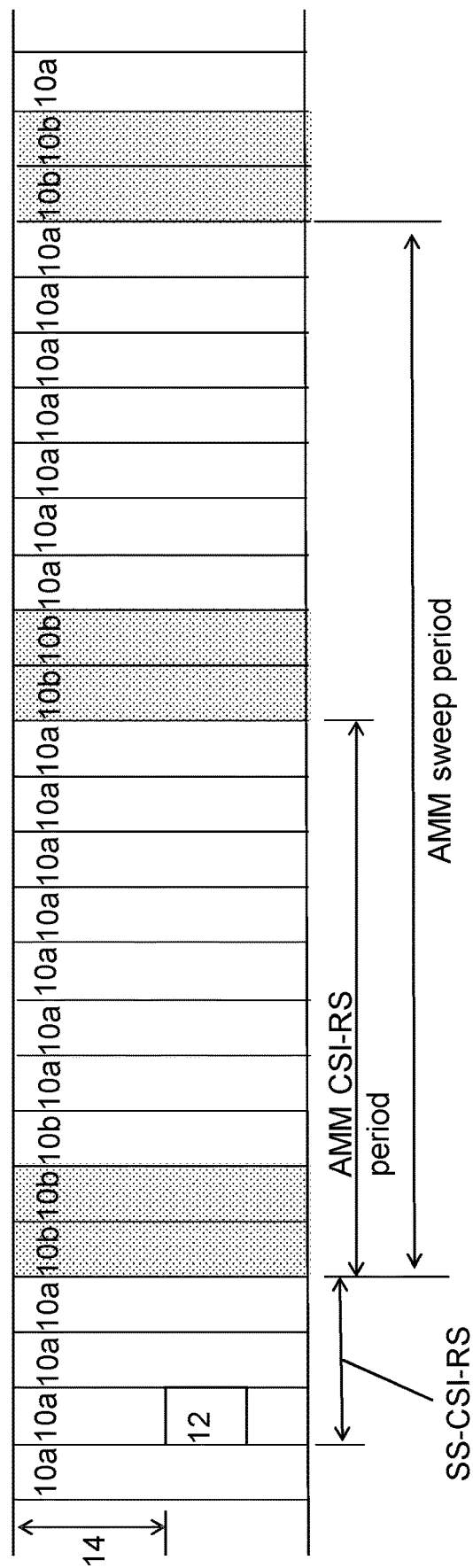
FIGS. 3A and 3B illustrate different degrees of freedom for beam identifier representation, according to some embodiments.
Figure 3B:
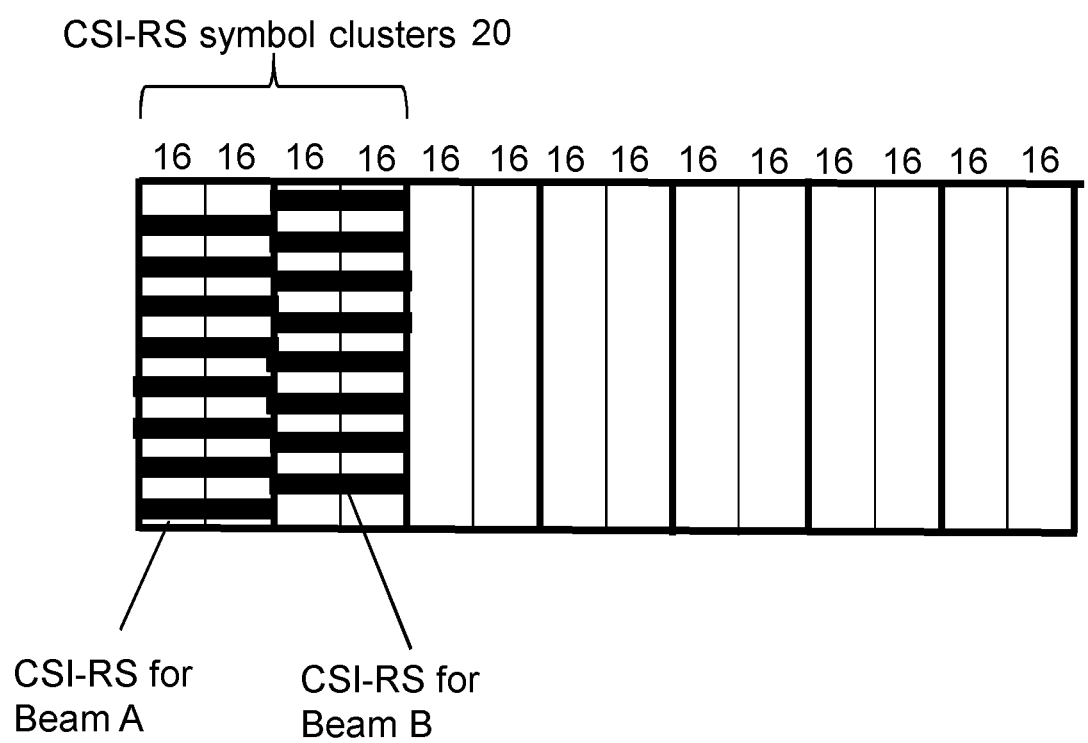

FIGS. 3A and 3B illustrate different degrees of freedom for beam identifier representation, according to some embodiments. FIG. 3A illustrates a plurality of slots 10. Each AMM CSI-RS period may include AMM slots 10b. The illustrated example includes two AMM slots 10b per AMM CSI-RS period. The illustrated AMM sweep period may include multiple AMM CSI-RS periods.

FIG. 3A also illustrates system synchronization (SS) signal 12. SS signal 12 has a SS-CSI-RS frequency offset 14 (i.e., frequency offset of the SS in relation to the CSI-RS) and SS-CSI-RS time offset 18 (i.e., time offset of the SS in relation to the CSI-RS). Other examples may include different offsets.

FIG. 3B illustrates an example AMM slot 10b, similar to AMM slot 10b illustrated in FIG. 3A. The AMM slot includes 14 OFDM symbols 16. In an AMM slot, the OFDM symbols may be referred to as CSI-RS symbols 16. A group of CSI-RS symbols 16 form CSI-RS symbol cluster 20. As illustrated, CSI-RS for different beams (e.g., beam A and beam B) may use different time and frequency resources within a CSI-RS symbol cluster.

The example configuration in FIGS. 3A an 3B illustrate several available dimensions and do not necessarily represent an optimal configuration in any given scenario. All or a subset of the listed dimensions may be included in constructing the beam identifier address space that suits the mobility performance/cost trade-offs of a given network deployment.

Particular embodiments may configure the UE with AMM-CSI-RS configurations. In NR, the SS will generally not be located in the middle of the carrier, but at a limited number of possible predetermined locations, to limit the UE search effort during initial access. When the UE detects an SS as part of AMM measurements, the location of the SS does not unambiguously determine the frequency range in which the CSI-RS will be transmitted both due to the non-center location and due to possible variable CSI-RS bandwidth. Furthermore, the CSI-RS location in time (AMM slot period and phase with respect to subframe/frame boundaries) may be unknown to the UE.

To facilitate efficient measurements in cases when this information is not available (e.g., via the physical broadcast channel (PBCH)) the network may, in some embodiments, pre-configure the UE with the CSI-RS location (i.e., the location of the link search/measurement range) in relation to the SS location, and also the bandwidth of the CSI-RS. The information may be provided by the source node as part of handover measurement configuration. Upon detecting the SS, the UE may proceed with link-specific measurements according to different T/F/layer/sequence allocations.

In some embodiments, in the RRC measurement configuration signaling, the frequency to measure in measurement object is still the center of the carrier as in LTE. In particular embodiments, the source cell informs the UE of a list of offsets which point to frequencies that are candidate positions of SS from neighbor cells. The signaling (e.g., RRC) may include the configuration of CSI-RS, CSI-RS T/F position and also the occupied bandwidth. The CSI-RS configuration may be relative to the center frequency.

In some embodiments, in the measurement configuration signaling (e.g., RRC), the frequency to measure in the measurement object is the exact location of SS. Similar as above, in the RRC signaling, it also includes the configuration of CSI-RS, CSI-RS T/F position and occupied bandwidth. The CSI-RS configuration may be relative to SS position.

In some embodiments, the network may further configure the UE with a subset of cells and/or links for those cells to measure. For example, the serving cell may determine the relevant cell/link subset to be measured based on previously collected ANR information about which cells and/or links may be detectable at the approximate location of the UE.

In some embodiments, the UE may perform a fully blind search over the above configuration options after detecting the SS of a candidate cell. This may be useful in scenarios where the ANR data is to be updated or verified and audible cells/links that are previously not part of the ANR databases should be identified.

In some embodiments, some of the parameters (e.g., those common to the entire network) may be preconfigured at the UE while others (e.g., cell-specific) may be tested blindly.

In a particular embodiment, the network may configure a UE with a list of possible CSI-RS frequency allocations (e.g., bandwidth or frequency range, comb factor, and comb offset), a list of possible time allocations (e.g., slot and/or symbol offsets in relation to SSB timing), and a list of seed offsets. The network transmits CSI-RS from multiple cells. In each cell, CSI-RS may be transmitted at all or a subset of the frequency and time parameter settings in the allocation lists. Furthermore, each cell identifier and one or more seed offset values in the seed offset list are used to determine seed values for CSI-RS sequences. The cell ID-to-seed mapping may be one-to-many (i.e., multiple seed values are possible for a given cell ID and seed offset). The mapping may be determined in a standard specification, such as a 3GPP specification. Every transmitted CSI-RS is associated with a virtual identifier encompassing the seed, frequency, and time allocation information, again based on a standard specification.

The UE uses the configured lists to generate full search parameter sets for CSI-RS detection. The UE detects an SSB from a neighbor cell and obtains timing and frequency alignment using conventional synchronization procedures. The UE obtains the cell identifier based on the SSB. The cell identifier together with the seed offset list is used to generate a set of CSI-RS sequence seeds that may be used in the cell according to the mapping in the standard. The UE then searches for CSI-RS signals with sequences corresponding to the determined seeds at combinations of possible frequency and time parameters in the allocation lists. When a CSI-RS is detected, with quality that should be reported according to previously configured reporting conditions, the UE reports the virtual identifier encompassing the seed, frequency, and time allocation information based on the standard specification.

Particular embodiments may include methods in a network node and a wireless device. The examples and embodiments described above may be generally represented by the flowcharts in FIGS. 4 and 5.

Figure 4:
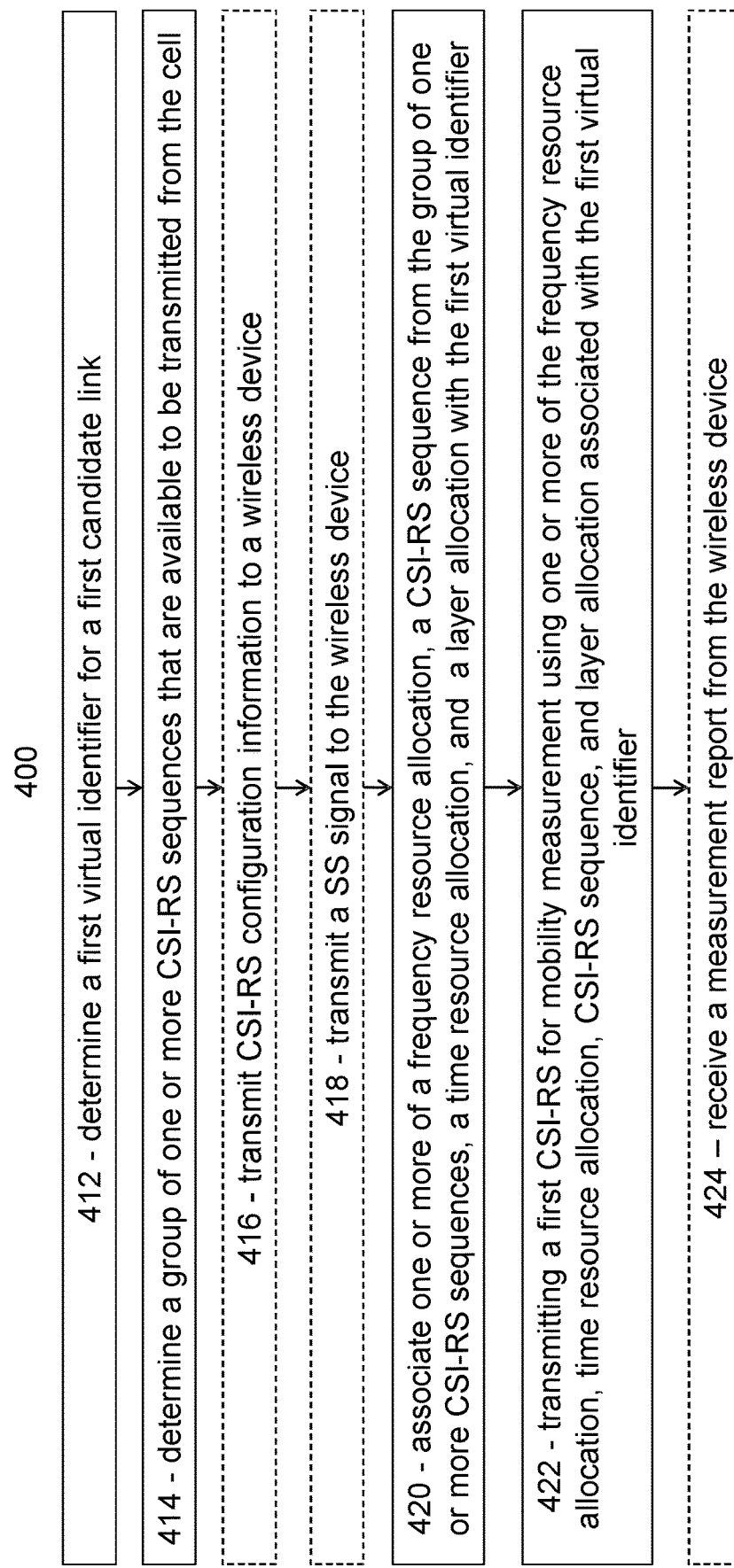
FIG. 4 is a flow diagram illustrating an example method for use in a network node, according to some embodiments.

FIG. 4 is a flow diagram illustrating an example method for use in a network node, according to some embodiments. In particular embodiments, one or more steps of FIG. 4 may be performed by components of wireless network 100 described with respect to FIG. 2.

The method begins at step 412, where the network node determines a virtual identifier for a link. The determination may be based at least on one of a beam identifier in a multi-beam cell, a TRP in a multi-TRP cell, or a sector in a multi-sector cell. For example, network node 120a may determine a virtual identifier for a wireless signal 130 based on a beam identifier according to any of the examples and embodiments described above (e.g., the virtual identifier may be based in part on a cell identifier when the virtual identifier address space is relative to the cell or may not be based on cell identifier when the virtual identifier address space is relative to a cell group).

At step 414, the network node determines a group of one or more CSI-RS sequences that are available to be transmitted from the cell (i.e., allocated to the cell if the virtual identifier depends on the cell identifier, or allocated to a cell group). For example, network node 120a may determine one or more CSI-RS sequences (e.g., defined by generator seed values) that are available to be transmitted from cell 115a according to any of the examples and embodiments described above.

At step 416, the network node may transmit CSI-RS configuration information to a wireless device. The CSI-RS configuration information comprises, for each CSI-RS of a plurality of CSI-RS, one or more of a frequency resource allocation, a time resource allocation, a CSI-RS sequence, and a layer allocation. For example, network node 120a may transmit the CSI-RS configuration information (e.g., via RRC) to wireless device 110. An advantage of particular embodiments is that the configuration information may be abbreviated because portions of the configuration for each CSI-RS may be inferred based on the frequency resource allocation, time resource allocation, CSI-RS sequence, and/or layer allocation.

At step 418, the network node may transmit a SS signal to the wireless device. For example, network node 120a may transmit a SS signal to wireless device 110. The SS signal may include configuration information, such as a cell identifier. In some embodiments, the CSI-RS configuration information may be specified relative to a time and/or frequency position of the transmitted SS signal and/or the cell identifier associated with the transmitted SS signal.

At step 420, the network node associates one or more of (1) a frequency resource allocation, (2) a CSI-RS sequence from the group of one or more CSI-RS sequences, (3) a time resource allocation, and (4) a layer allocation with the determined virtual identifier. For example, network node 120 may select time and frequency allocations and a CSI-RS sequence based on the determined virtual identifier. Some examples of resource allocations are described with respect to FIGS. 3A and 3B.

At step 422, the network node transmits a CSI-RS for mobility measurement using one or more of the selected frequency resource allocation, the selected time resource allocation, the selected CSI-RS sequence, and the layer allocation. For example, network node 120 may transmit the CSI-RS using the selected parameters to wireless device 110.

Some or all of steps 412 to 422 may be repeated for additional CSI-RS. For example, network node 120a may determine a second virtual identifier for a second link, associate one or more of a frequency resource allocation, a time resource allocation, a CSI-RS sequence from the group of one or more CSI-RS sequences, and a layer allocation with the second virtual identifier, and transmit a second CSI-RS using allocated resources to wireless device 110.

At step 424, the network node may receive a measurement report. For example, network node 120a may receive a measurement report from wireless device 110 reporting a link quality based on a measured CSI-RS. In some embodiments, the measurement report includes a virtual identifier. The network node may determine which link the measurement report is associated with (e.g., which CSI-RS was measured) based on the virtual identifier in the measurement report.

Modifications, additions, or omissions may be made to method 400. Additionally, one or more steps in method 400 of FIG. 4 may be performed in parallel or in any suitable order. For example, in particular embodiments step 420 may come before step 416. The steps of method 400 may be repeated over time as necessary.

Figure 5:
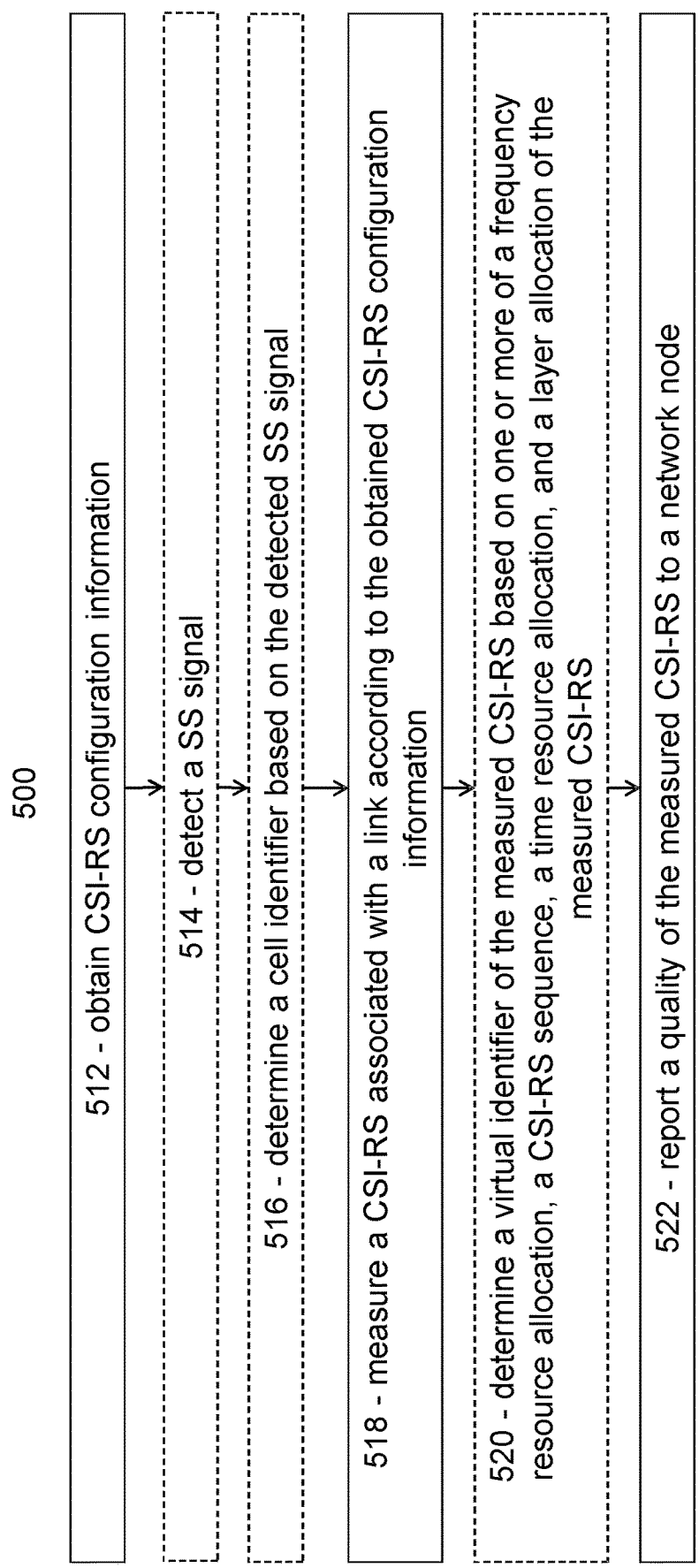
FIG. 5 is a flow diagram illustrating an example method for use in a wireless device, according to some embodiments.

FIG. 5 is a flow diagram illustrating an example method for use in a wireless device, according to some embodiments. In particular embodiments, one or more steps of FIG. 5 may be performed by components of wireless network 100 described with respect to FIG. 2. The CSI-RS-aided AMM measurement procedure at the wireless device may comprise the steps described below. The procedure may be triggered by a predefined event, triggered by a command from the network, or performed periodically to monitor serving and candidate cell qualities.

The method begins at step 512, where the wireless device obtains CSI-RS configuration information. The CSI-RS configuration information comprises, for a plurality of CSI-RS, one or more of a frequency resource allocation, a time resource allocation, a CSI-RS sequence generator seed, a bandwidth allocation, and a layer allocation.

For example, wireless device 110 may obtain the predetermined set of resources (e.g., via RRC) from network node 120a. The wireless device may receive CSI-RS configuration info (e.g., where the CSI-RS signal may be located in in relation to the detected SS, which cell identifiers should be searched for, and/or which beam identifier range (e.g., which T/F allocation and sequence options) should be measured). In other embodiments, the wireless device may obtain the configuration information via other suitable signaling or configuration methods.

At step 514, the wireless device may detect a synchronization signal. For example, wireless device 110 may detect a synchronization signal from network node 120a. In some embodiments, the wireless device detects candidate cell SS (e.g., via the PSS/SSS). The candidate cell list may be preconfigured or the detection may be blind, including any detectable SS.

At step 516, according to some embodiments the wireless device may determine a cell identifier based on the received synchronization signal. For example, wireless device 110 may determine a cell identifier based on the received synchronization signal for cell 115a according to any of the examples and embodiments described above. The cell identifier may be a PCI or another cell identifier.

At step 518, the wireless device measures a CSI-RS according to the predetermined and/or obtained set of time resource allocations, frequency resource allocations, layer allocations, bandwidth and CSI-RS sequences. For example, wireless device 110 may measure the CSI-RS using the selected parameters according to any of the examples and embodiments described above. The wireless device receives AMM CSI-RS symbol clusters according to the search space preconfigured in step 516 or according to a blind search list. The wireless device performs CSI-RS measurements at relevant T/F locations with respect to the SS location, and at multiple relevant T/F/layer/sequence allocations based on the cell identifier.

At step 520, the wireless device may determine a virtual identifier of the measured CSI-RS based on one or more of a frequency resource allocation, a CSI-RS sequence, a time resource allocation, and a layer allocation of the measured CSI-RS. For example, wireless device 110 may determine a virtual identifier that identifies a particular beam by combining the received CSI-RS sequence with the time and or frequency resources associated with the received CSI-RS.

In particular embodiments, steps 512-520 may be repeated for multiple candidate cells. In some embodiments, multiple cells may be detected in a single operation in step 512.

At step 522, the wireless device reports one or more CSI-RS measurements to the network node. For example, wireless device 110 may report a CSI-RS measurement to network node 120a. The wireless device may report one more measured link qualities to the network (e.g., to the serving cell). For example, the wireless device may report a predetermined number of best cells and/or link qualities and identities out of the measured T/F/layer/sequence allocations. The report may include the virtual identifiers associated with each link. The reporting criteria and report contents may be previously configured via higher-layer signaling.

Modifications, additions, or omissions may be made to method 500. Additionally, one or more steps in method 500 of FIG. 5 may be performed in parallel or in any suitable order. The steps of method 500 may be repeated over time as necessary.

Figure 6B:
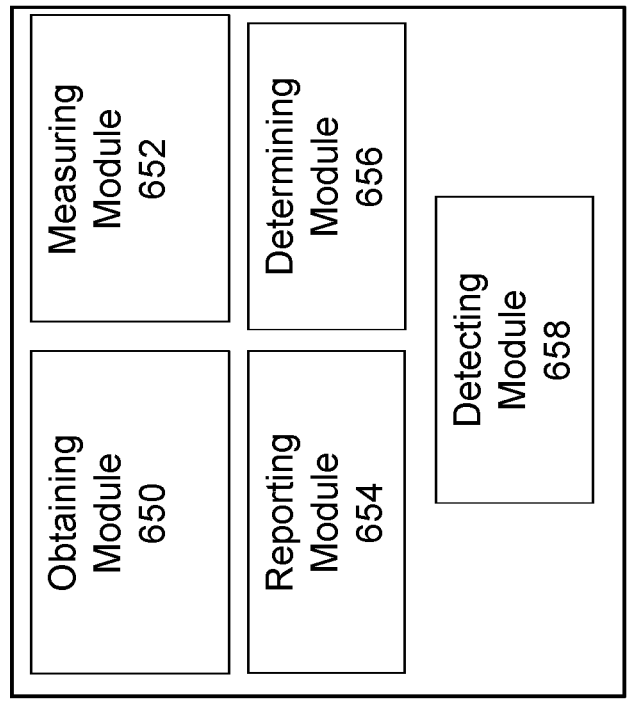
FIG. 6B is a block diagram illustrating example components of a wireless device.
Figure 6A:
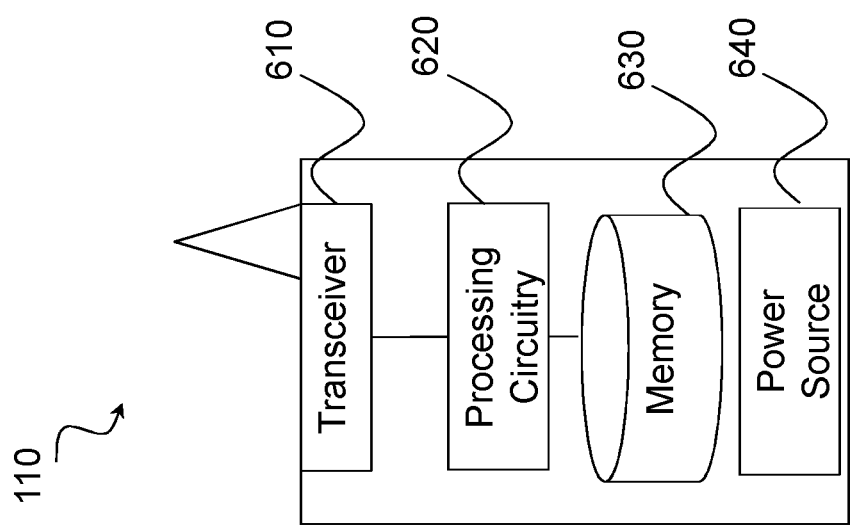
FIG. 6A is a block diagram illustrating an example embodiment of a wireless device.

FIG. 6A is a block diagram illustrating an example embodiment of a wireless device. The wireless device is an example of the wireless devices 110 illustrated in FIG. 2. In particular embodiments, the wireless device is capable of mobility measurement of a network node link quality. The wireless device may detect a synchronization signal; measure a CSI-RS according to a predetermined set of time resource allocations, frequency resource allocations, layer allocations, bandwidth and CSI-RS sequences; and report one or more CSI-RS measurements to the network node.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 610, processing circuitry 620, memory 630, and power source 640. In some embodiments, transceiver 610 facilitates transmitting wireless signals to and receiving wireless signals from wireless network node 120 (e.g., via an antenna), processing circuitry 620 executes instructions to provide some or all of the functionality described herein as provided by the wireless device, and memory 630 stores the instructions executed by processing circuitry 620. Power source 640 supplies electrical power to one or more of the components of wireless device 110, such as transceiver 610, processing circuitry 620, and/or memory 630.

Processing circuitry 620 includes any suitable combination of hardware and software implemented in one or more integrated circuits or modules to execute instructions and manipulate data to perform some or all of the described functions of the wireless device. In some embodiments, processing circuitry 620 may include, for example, one or more computers, one more programmable logic devices, one or more central processing units (CPUs), one or more microprocessors, one or more applications, and/or other logic, and/or any suitable combination of the preceding. Processing circuitry 620 may include analog and/or digital circuitry configured to perform some or all of the described functions of wireless device 110. For example, processing circuitry 620 may include resistors, capacitors, inductors, transistors, diodes, and/or any other suitable circuit components.

Memory 630 is generally operable to store computer executable code and data. Examples of memory 630 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 640 is generally operable to supply electrical power to the components of wireless device 110. Power source 640 may include any suitable type of battery, such as lithium-ion, lithium-air, lithium polymer, nickel cadmium, nickel metal hydride, or any other suitable type of battery for supplying power to a wireless device.

In particular embodiments, processing circuitry 620 in communication with transceiver 610 performs mobility measurement of a network node link quality according to any of the embodiments described herein.

Other embodiments of the wireless device may include additional components (beyond those shown in FIG. 6A) responsible for providing certain aspects of the wireless device's functionality, including any of the functionality described above and/or any additional functionality (including any functionality necessary to support the solution described above).

FIG. 6B is a block diagram illustrating example components of a wireless device 110. The components may include obtaining module 650, measuring module 652, reporting module 654, and detecting module 658.

Obtaining module 650 may perform the obtaining functions of wireless device 110. For example, obtaining module 650 may obtain CSI-RS configuration information according to any of the embodiments and examples described above. In certain embodiments, obtaining module 650 may include or be included in processing circuitry 620. In particular embodiments, obtaining module 650 may communicate with measuring module 652, reporting module 654, determining module 656, and detecting module 658.

Measuring module 652 may perform the measuring functions of wireless device 110. For example, measuring module 652 may measure a CSI-RS according to any of the embodiments and examples described above. In certain embodiments, measuring module 652 may include or be included in processing circuitry 620. In particular embodiments, measuring module 652 may communicate with obtaining module 650, reporting module 654, and detecting module 658.

Reporting module 654 may perform the reporting functions of wireless device 110. For example, reporting module 654 may report the quality of a link to network node 120 according to any of the embodiments described above. In certain embodiments, reporting module 654 may include or be included in processing circuitry 620. In particular embodiments, reporting module 654 may communicate with obtaining module 650, measuring module 652 and detecting module 658.

Determining module 656 may perform the determining functions of wireless device 110. For example, determining module 656 may determine a virtual identifier associated with a CSI-RS according to any of the embodiments described above. In certain embodiments, determining module 654 may include or be included in processing circuitry 620. In particular embodiments, determining module 654 may communicate with obtaining module 650, measuring module 652, reporting module 654 and detecting module 658.

Detecting module 658 may perform the detecting functions of wireless device 110. For example, detecting module 658 may detect reference and/or synchronization signals according to any of the embodiments described above. In certain embodiments, detecting module 658 may include or be included in processing circuitry 620. In particular embodiments, detecting module 658 may communicate with measuring module 652 and reporting module 654.

Figure 7B:
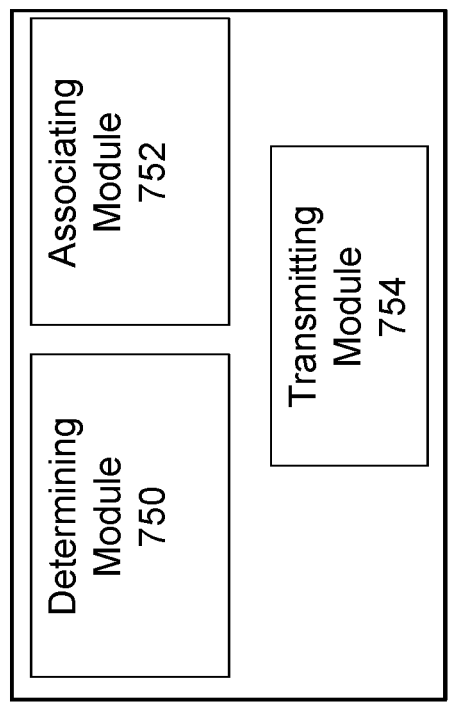
FIG. 7B is a block diagram illustrating example components of a network node.
Figure 7A:
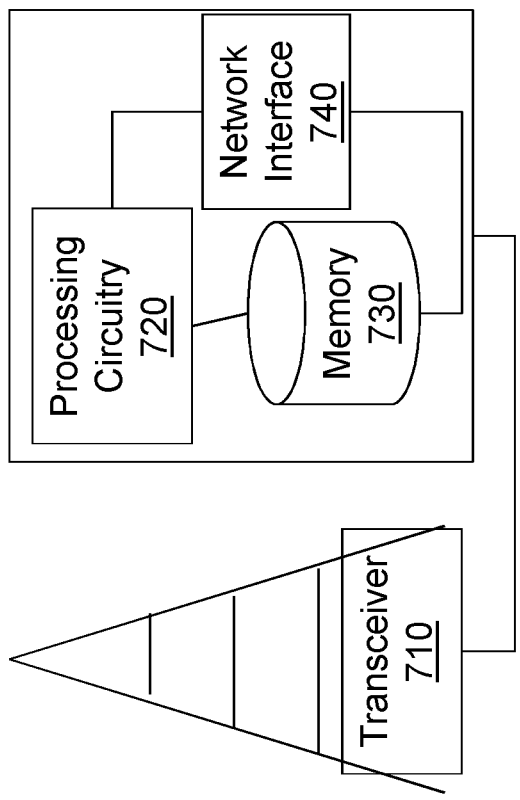
FIG. 7A is a block diagram illustrating an example embodiment of a network node.

FIG. 7A is a block diagram illustrating an example embodiment of a network node. The network node is an example of the network node 120 illustrated in FIG. 2. In particular embodiments, the network node is capable of transmitting a mobility measurement signal to evaluate a quality of a candidate link from a cell. The network node may determine a virtual identifier for the candidate link based at least on one of a beam identifier in a multi-beam cell, a TRP in a multi-TRP cell, or a sector in a multi-sector cell; determine a group of one or more CSI-RS sequences that are available to be transmitted from the cell; select, based on the determined virtual identifier, one or more of (1) a frequency resource allocation, (2) a CSI-RS sequence from the group of one or more CSI-RS sequences, (3) a time resource allocation, and (4) a layer allocation; and transmit a CSI-RS for mobility measurement using one or more of the selected frequency resource allocation, the selected time resource allocation, the selected CSI-RS sequence, and the layer allocation.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 710, processing circuitry 720, at least one memory 730, and at least one network interface 740. Transceiver 710 facilitates transmitting wireless signals to and receiving wireless signals from a wireless device, such as wireless devices 110 (e.g., via an antenna); processing circuitry 720 executes instructions to provide some or all of the functionality described above as being provided by a network node 120; memory 730 stores the instructions executed by processing circuitry 720; and network interface 740 communicates signals to backend network components, such as a gateway, switch, router, Internet, Public Switched Telephone Network (PSTN), controller, and/or other network nodes 120. Processing circuitry 720 and memory 730 can be of the same types as described with respect to processing circuitry 620 and memory 630 of FIG. 6A above.

In some embodiments, network interface 740 is communicatively coupled to processing circuitry 720 and refers to any suitable device operable to receive input for network node 120, send output from network node 120, perform suitable processing of the input or output or both, communicate to other devices, or any combination of the preceding. Network interface 740 includes appropriate hardware (e.g., port, modem, network interface card, etc.) and software, including protocol conversion and data processing capabilities, to communicate through a network.

In particular embodiments, processing circuitry 720 in communication with transceiver 710 transmits a mobility measurement signal to evaluate a quality of a candidate link from a cell.

Other embodiments of network node 120 include additional components (beyond those shown in FIG. 7A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 7B is a block diagram illustrating example components of a network node 120. The components may include determining module 750, associating module 752, and transmitting module 754.

Determining module 750 may perform the determining functions of network node 120. For example, determining module 750 may determine a virtual identifier for a candidate link and a group of CSI-RS sequences according to any of the embodiments described above. In certain embodiments, determining module 750 may include or be included in processing circuitry 720. In particular embodiments, determining module 750 may communicate with associating module 752 and transmitting module 754.

Associating module 752 may perform the associating functions of network node 120. For example, associating module 752 may associate one or more resource allocations with a virtual identifier (e.g., beam identifier, link identifier, etc.) according to any of the embodiments and examples described above. In certain embodiments, associating module 752 may include or be included in processing circuitry 720. In particular embodiments, associating module 752 may communicate with determining module 750 and transmitting module 754.

Transmitting module 754 may perform the transmitting functions of network node 120. For example, transmitting module 754 may transmit a CSI-RS and/or a SS signal to wireless device 110 according to any of the embodiments described above. In certain embodiments, transmitting module 754 may include or be included in processing circuitry 720. In particular embodiments, transmitting module 754 may communicate with determining module 750 and associating module 752.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
CSI Channel State Information
CSI-RS Channel State Information Reference Signal
D2D Device to Device
DL Downlink
DMRS Demodulation Reference Signal
eNB eNodeB
FDD Frequency Division Duplex
LTE Long Term Evolution
M2M Machine to Machine
MAC Medium Access Control
MIMO Multi-Input Multi-Output
MTC Machine Type Communication
NR New Radio
OFDM Orthogonal Frequency Division Multiplex
PDCCH Physical Downlink Control Channel
PDSCH Physical Downlink Shared Channel
PRB Physical Resource Block
PUCCH Physical Uplink Control Channel
PUSCH Physical Uplink Shared Channel
RAN Radio Access Network
RAT Radio Access Technology
RB Resource Block
RBS Radio Base Station
RE Resource Element
RI Rank Index
RNC Radio Network Controller
RRC Radio Resource Control
RRH Remote Radio Head
RRU Remote Radio Unit
RS Reference Signal
SS System Synchronization
TDD Time Division Duplex
TRP Transmission Reception Point
UE User Equipment
UL Uplink
UTRAN Universal Terrestrial Radio Access Network
WAN Wireless Access Network

The invention claimed is:

1. A method for use in a network node of transmitting a measurement signal for evaluating a quality of a link from a cell, the method comprising:
determining a first virtual identifier for a first link;
determining a group of one or more channel state information reference signal (CSI-RS) sequences that are available to be transmitted from the cell;
associating a frequency resource allocation, a time resource allocation, a CSI-RS sequence from the group of one or more CSI-RS sequences, and a layer allocation with the first virtual identifier; and
transmitting a first CSI-RS for measurement using the frequency resource allocation, time resource allocation, CSI-RS sequence, and layer allocation associated with the first virtual identifier, the first virtual identifier mapping to a cell identifier and uniquely identifying a beam in a measurement region including multiple cells and a portion of the first virtual identifier being encoded in a sequence of the transmitted first CSI-RS.

2. The method of claim 1, wherein determining the first virtual identifier is based on a cell identifier of the cell.

3. The method of claim 1, wherein determining the first virtual identifier is based on at least one of a beam identifier in a multi-beam cell, a transmission reception point (TRP) in a multi-TRP cell, or a sector in a multi-sector cell.

4. The method of claim 1, further comprising transmitting CSI-RS configuration information to a wireless device, the CSI-RS configuration information comprising, for each CSI-RS of a plurality of CSI-RS, one or more of a frequency resource allocation, a time resource allocation, a CSI-RS sequence, and a layer allocation.

5. The method of claim 1, further comprising:
determining a second virtual identifier for a second link;
associating one or more of a frequency resource allocation, a time resource allocation, a CSI-RS sequence from the group of one or more CSI-RS sequences, and a layer allocation with the second virtual identifier;
transmitting a second CSI-RS for measurement using one or more of the frequency resource allocation, time resource allocation, CSI-RS sequence, and layer allocation associated with the second virtual identifier;
receiving a measurement report, the measurement report comprising a virtual identifier; and
determining whether the measurement report is associated with the first link or the second link based on the virtual identifier in the measurement report.

6. A network node operable to transmit a measurement signal for evaluating a quality of a link from a cell, the network node comprising processing circuitry configured to:
determine a first virtual identifier for a first link;
determine a group of one or more channel state information reference signal (CSI-RS) sequences that are available to be transmitted from the cell;
associate a frequency resource allocation, a time resource allocation, a CSI-RS sequence from the group of one or more CSI-RS sequences, and a layer allocation with the first virtual identifier; and
transmit a first CSI-RS for measurement using the frequency resource allocation, time resource allocation, CSI-RS sequence, and layer allocation associated with the first virtual identifier, the first virtual identifier mapping to a cell identifier and uniquely identifying a beam in a measurement region including multiple cells and a portion of the first virtual identifier being encoded in a sequence of the transmitted first CSI-RS.

7. The network node of claim 6, wherein the processing circuitry is operable to determine the first virtual identifier based on a cell identifier of the cell.

8. A method for use in a wireless device of measurement of a link quality, the method comprising:
obtaining channel state information reference signal (CSI-RS) configuration information, the CSI-RS configuration information comprising, for a plurality of CSI-RS, a frequency resource allocation, a time resource allocation, a CSI-RS sequence generator seed, a bandwidth allocation, and a layer allocation, the CSI-RS configuration information further comprising a virtual identifier for a link, the first virtual identifier mapping to a cell identifier and uniquely identifying a beam in a measurement region including multiple cells;

measuring a CSI-RS associated with the link according to the obtained CSI-RS configuration information; and reporting a quality of the measured CSI-RS to a network node.

9. The method of claim 8, wherein measuring the CSI-RS associated with the link comprises blindly searching the allocations in the CSI-RS configuration for the CSI-RS.

10. The method of claim 8, further comprising determining a virtual identifier of the measured CSI-RS based on one or more of a frequency resource allocation, a time resource allocation, a CSI-RS sequence, a bandwidth allocation, and a layer allocation of the measured CSI-RS; and wherein reporting the quality of the measured CSI-RS includes reporting the determined virtual identifier associated with the measured CSI-RS.

11. The method of claim 8, further comprising detecting a system synchronization (SS) signal.

12. The method of claim 11, wherein at least part of the CSI-RS configuration information is specified relative to a time and frequency position of the detected SS signal.

13. A wireless device capable of measurement of a link quality, the wireless device comprising processing circuitry configured to:

obtain channel state information reference signal (CSI-RS) configuration information, the CSI-RS configuration information comprising, for a plurality of CSI-RS, a frequency resource allocation, a time resource allocation, a CSI-RS sequence generator seed, a bandwidth allocation, and a layer allocation, the CSI-RS configuration information further comprising a virtual identifier for a link, the first virtual identifier mapping to a cell identifier and uniquely identifying a beam in a measurement region including multiple cells;

measure a CSI-RS associated with the link according to the obtained channel state information; and report a quality of the measured CSI-RS to a network node.

14. The wireless device of claim 13, wherein the processing circuitry is configured to measure the CSI-RS associated with the link by blindly searching the allocations in the CSI-RS configuration for the CSI-RS.

* * * * *